Aug. 23, 1960   V. S. SKALABRIN   2,949,838
CAMERA GRIP FOR MINIATURE CAMERAS
Filed Feb. 8, 1960   2 Sheets-Sheet 1

VLADIMIR S. SKALABRIN
INVENTOR.

BY Smith & Tuck

Aug. 23, 1960 — V. S. SKALABRIN — 2,949,838
CAMERA GRIP FOR MINIATURE CAMERAS
Filed Feb. 8, 1960 — 2 Sheets-Sheet 2

VLADIMIR S. SKALABRIN
INVENTOR.

BY Smith & Tuck

United States Patent Office 2,949,838
Patented Aug. 23, 1960

2,949,838

CAMERA GRIP FOR MINIATURE CAMERAS

Vladimir S. Skalabrin, 9049 Meridian, Seattle, Wash.

Filed Feb. 8, 1960, Ser. No. 7,330

5 Claims. (Cl. 95—86)

This present invention relates to a grip or handle for quick attachment to miniature cameras, which term normally includes the 35 millimeter cameras having either range finder focusing means or the single lens reflex type of viewing and focusing.

In the employment of 35 millimeter or miniature cameras it is particularly necessary that the film be carefully exposed so that the resulting negative or colored slide may be enlarged many times in the normal course of making use of the pictures taken. When this occurs it becomes increasingly important that steps be taken so that the camera will be held with maximum steadiness and it is further very desirable that a cable release be provided so that the act of releasing the shutter will not cause a displacement of the camera at the critical instant of exposure. The ordinary miniature cameras, of which we have many hundreds of different manufactured types, owe their popularity in part at least to their small size, which brings with it the attendant difficulty of adequately and safely handling the same. With my present camera grip I believe I have provided a practical means of supplying this need.

The principal object of my present invention therefore is to provide an easily removable camera grip having a configured hand grip portion adapted to substantially position the fingers of one hand to give both steadiness and security to the grip on the camera.

A further object of this invention is to provide a camera grip that is adjustable to such a degree that it can be used on a wide range of the usual 35 millimeter cameras whether they use the range finder system of focusing or the direct focusing as by means of the single lens reflex plan.

A further object of this invention is to provide a secure hand grip that can be attached to a miniature camera which will have within itself a degree of resiliency and will in addition permit the mounting of a cable release so that at the instant of exposure any tendency toward jerking or displacing the camera will be largely prevented.

Further objects, advantages and capabilities will be apparent from the description and disclosure in the drawings or may be comprehended or are inherent in the device.

Figure 1:
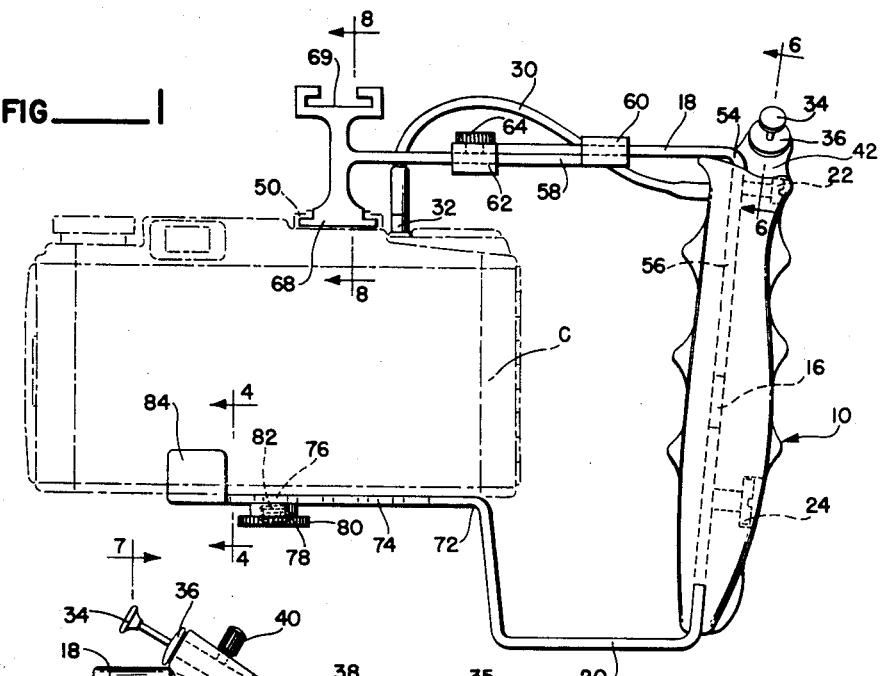
Figure 1 shows in full line elevation one preferred embodiment of my invention and to show its adaption to a miniature camera such a camera is shown in dashed line outline.

Referring to the drawings, throughout which like reference characters indicate like parts, the numeral 10 designates the hand grip portion of my device. This grip should be formed so as to provide a plurality of finger locating channels 12 with ribs 14 separating the channels. Such an arrangement provides a natural hand grip that gives a very high degree of security. The ease with which a secure gripping of the camera can be achieved is a very important feature of my device. In practice it has been found that the various moldable plastics form an ideal material for hand grip 10. The plastics themselves are normally nonconductive of electric current for instance and they are the most convenient material for a hand grip either in hot or very cold climate. Extending longitudinally through hand grip 10 is a frame channel 16 normally having a rectangular cross section so as to accept in a slidable manner one end of the upper frame member 18 and one end of the lower frame member 20. These frames are preferably made of flat bar stock of about the proportions illustrated throughout the drawings and of material having a limited degree of resiliency. Hand grip 10 is provided with locking screws as 22 and 24 adapted to engage respectively the upper and lower frame members and to hold them securely in the adjusted position.

In order to obtain maximum utility from my camera grip device it is desirable to employ a cable release as 30 of the conventional type having the metal end fitting 32 adapted to engage the camera shutter release mechanism and at its other end to have the usual construction of a push-button terminus 34 of the flexible release cable 35. Such cable releases are normally provided with a finger grip portion 36 which is used between the fore and second finger in order to secure the outer sheathing 38 of the cable release. Fitting 36 is often provided with a set-screw as 40 so that the flexible wire element 35 may be secured with reference to the sheath when the wire is in the depressed condition, as this is a necessary requirement with a great number of the focal plane shuttered cameras that have no convenient way of having a time exposure holding means. In my present handle grip 10 I provide a slightly offset boss 42 to engage the operating end of the cable release which must position the cable release conveniently for thumb operation where it will not restrict the movement of the upper frame member 18 when it is desired to detach the same from the camera. When so arranged the screw 40 when not seated upon the cable 35 still serves to position the reactance terminal 36 and hold it in operational position.

In order to attach the grip of this present invention to a camera C in a secure manner, that will serve the various purposes of this invention and still have the device readily detachable, use is made of two elements, normally present in all miniature cameras. One is the accessory clip 50, which is habitually found on the upper edge of the typical camera and which is used to hold many accessories such as special view finders, short focusing equipment, flash equipment and the like. It is normally sturdily constructed and well secured to the camera. The second element, normally present at the base of the camera, is a tripod socket. This again is positioned where the camera is specially strengthened to receive it and forms a very secure attachment point.

Figure 2:
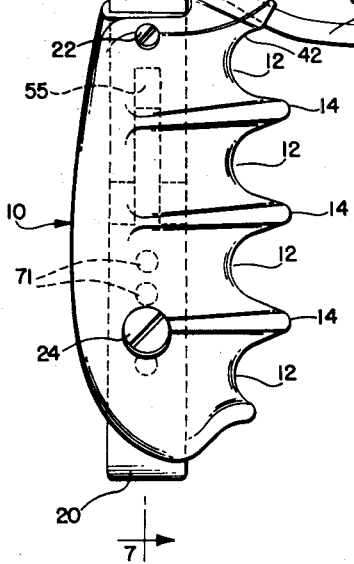
Figure 2 is a side elevation of my camera grip.
Figure 3:
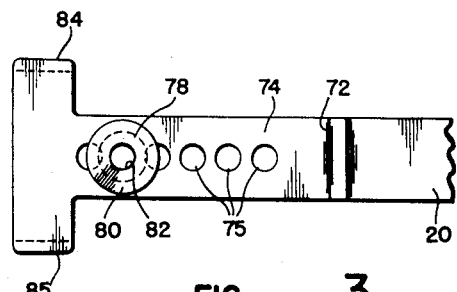
Figure 3 is a bottom plan view of the portion of the frame supporting my camera grip and which engages the lower surface of a camera.
Figure 4:
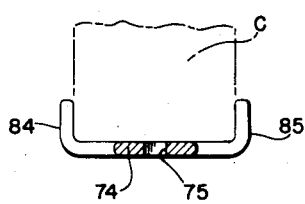
Figure 4 is a vertical cross sectional view taken along the line 4—4 of Figure 1.
Figure 5:
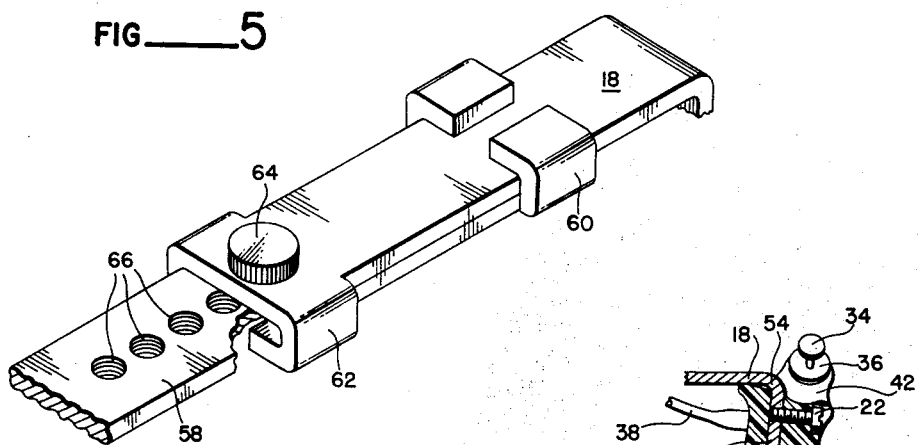
Figure 5 is a fragmentary perspective view on enlarged scale, showing the adjusting means employed in adjusting the length of the top frame portion of my camera grip with certain parts broken away and sectioned.
Figure 6:
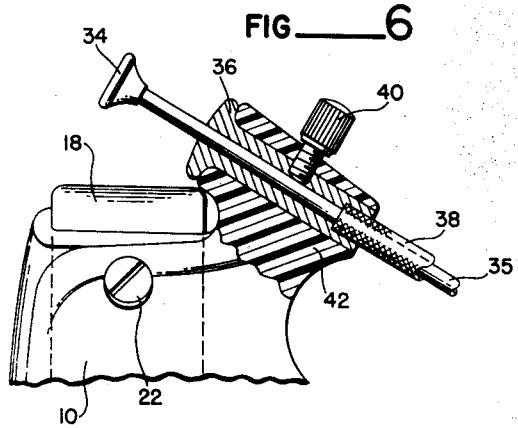
Figure 6 is an enlarged vertical cross-sectional view taken along the line 6—6 of Figure 1.
Figure 7:
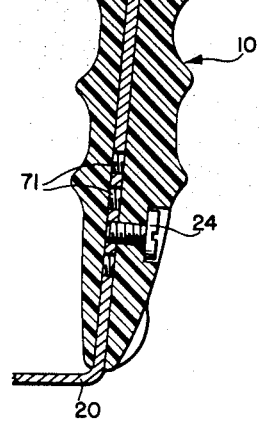
Figure 7 is a vertical cross-sectional view taken along the line 7—7 of Figure 2.
Figure 8:
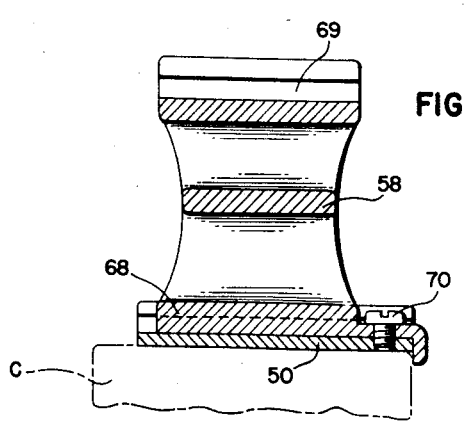
Figure 8 is an enlarged scale vertical cross sectional view taken along the line 8—8 of Figure 1.

Referring to the upper frame portion 18, this is preferably formed of a piece of strap metal stock having a bend at 54 of substantially 90 degrees although in the illustration, as shown in Figure 1, the angle is slightly more as a matter of convenience. The downwardly directed leg portion 56 may be bifurcated at 55, as shown in Figure 2, to accept a tongue of the lower frame member 20. This construction gives considerable stiffness to the metal frame. In this case the locking screw 22 merely fixedly secures frame 18 in place in the hand grip portion 10. It is to be recognized that the various cameras of this type, while substantially the same size, have many design characteristics in which they differ. One of these is the point of placement of the accessory clip 50. The clips themselves are substantially standardized in size throughout their manufacture however. It is necessary in adapting my device to a camera that sufficient space be provided between the hand grip 10 and the camera so that the hand can be conveniently inserted and the fingers wrapped around the grip, and in winter this is often complicated by gloves or mittens.

To provide a suitable range of adjustment it therefore has been found most convenient to have the upper frame made of two telescoping adjustable parts, the portion 18 and the portion 58. A positioning band 60 is secured to portion 58 and a similar partially wrapped-around band 62 is formed on the extreme end of member 18. These wrap-around bands control the positioning of portions 18 and 58 and cause them to slidably engage each other and when moved to move longitudinally. A securing screw 64 is provided and owing to the fact that the adjustment is rarely disturbed after it has been made for a particular camera it has been found most desirable to employ a plurality of threaded openings 66 in member 58 and to have screw 64 threadedly engage one of these openings, that will give the proper clearance between the hand grip and the adjacent end of the camera C. The extreme end of member 58 must at least be configured as at 68 to engage the accessory clip 50. Base 68 is preferably provided with a locking screw 70 to hold it securely within clip 50. In most cases, however, it is desirable to provide an upward extension disposed vertically above base 68 and have this member 69 formed as an additional accessory clip so that even though the camera grip or handle is in place, the user of the camera is not denied the use of the various camera accessories that are normally used in the accessory clip.

The lower frame member 20 is arranged so that it may be adjustably secured within the slot 16 of hand grip 10 and secured in its adjusted position preferably by threading screw 24 into one of a plurality of threaded openings 71 in the vertically extending portion of member 20. Frame member 20 is provided with a downwardly extending return bend as will be best understood from a study of Figure 1 and the purpose of this is to provide sufficient vertical space so that the four fingers of the average person, even if enclosed in a glove, can conveniently grip the hand grip 10. Figure 1 illustrates in fact one of the reasons why it is desirable to have special grip means for attachment to a miniature camera, especially when it is going to be used frequently, because the camera itself is not sufficiently large to provide an adequate grip. At the top of one leg of the U, a bend is formed at 72 and then a portion 74 is provided to lie against the bottom surface of the camera. This portion 74 should preferably be perforated with a large number of through openings 75 due to the fact that the tripod socket is variously positioned by different manufacturers. These openings are not threaded because the screw which is to engage the tripod socket 76, which is generally indicated in Figure 1, should pass through the unthreaded opening 75 and rely entirely upon the substantial threaded portion of the tripod socket of the camera itself. If a tripod is to be used with the camera it follows that a camera tripod screw could be used to tie member 74 to the camera. In most cases, however, a separate screw 78 preferably is provided which should have a reasonably wide flange 80 and be provided with a threaded tripod socket 82 as another means of attaching a tripod or particularly for attaching some of the various clamp means that are used instead of tripods, with these small cameras. At its extreme end, portion 74 of frame member 20 preferably is provided with upstanding lugs 84 and 85 which serve to anchor frame member 20 rigidly to the camera when they are somewhat removed from the tripod screw and to prevent any pivoting of the same about the tripod screw. This angular rigidity of the longitudinal axes of the bottom surface of the camera and the camera engaging frame portion is very desirable as it gives a high degree of security in the attachment of my camera grip to the camera.

It is believed that it will be clearly apparent from the above description and the disclosure in the drawings that the invention comprehends a novel construction of a camera grip for miniature cameras.

Having thus disclosed the invention, I claim:

1. A camera grip for miniature cameras having an accessory clip and a tripod socket, comprising: a hand grip portion having a frame channel extending longitudinally therethrough; an upper frame having one end adjustably positioned in said frame channel and the other adapted to be secured in the accessory clip of a miniature camera; a lower frame having one end adjustably secured in said frame channel, a vertically disposed return bend terminating in a bend, a camera engaging frame portion continuing from said bend and adapted to lie in engagement with the bottom surface of the camera, a plurality of through openings in said frame portion adapted to pass the screw which engages the tripod socket of the camera therethrough.

2. A camera grip for miniature cameras having an accessory clip and a tripod socket, comprising: a molded hand grip portion having a plurality of finger locating channels and a frame channel extending longitudinally therethrough; an upper frame having two telescoping frame portions disposed with one end adjustably positioned in said frame channel and the other end adapted to be secured in the accessory clip of a miniature camera; a lower frame having one end adjustably secured in said frame channel, a substantially right angle bend and a camera engaging frame portion continuing from said bend and adapted to lie in engagement with the bottom surface of the camera, a plurality of through openings in said frame portion adapted to pass the screw which engages the tripod socket of the camera therethrough.

3. The subject matter of claim 1, in which said camera engaging frame portion is provided with upstanding lugs adapted to engage the opposite sides of a camera body to prevent angular displacement of the longitudinal axes of said frame portion and the bottom surface of the camera.

4. The subject matter of claim 2, in which said upper frame is composed of two flat frame portions adapted to slide with a flat side of each in contact, the overlapping ends of each frame portion having a positioning means adjacent their ends which slidably engages the other frame portion and means for securing said frame portions in an adjusted position.

5. The subject matter of claim 1, in which said hand grip is formed to provide a plurality of finger locating channels and has an offset boss adapted to operatively position a shutter release cable so it may be operated by the thumb of the hand holding the said hand grip.

References Cited in the file of this patent

UNITED STATES PATENTS 2,638,041      Horydczak _____ May 12, 1953